United States Patent [19]
Harris et al.

[11] Patent Number: 6,009,336
[45] Date of Patent: Dec. 28, 1999

[54] HAND-HELD RADIOTELEPHONE HAVING A DETACHABLE DISPLAY

[75] Inventors: Daryl R. Harris, Rolling Meadows; Daniel L. Williams, Vernon Hills; Thomas J. Walczak, Woodstock, all of Ill.

[73] Assignee: Motorola, Inc., Schaumburg, Ill.

[21] Appl. No.: 08/677,478

[22] Filed: Jul. 10, 1996

[51] Int. Cl.⁶ .................................................. H04Q 7/32
[52] U.S. Cl. .......................................... 455/566; 455/556
[58] Field of Search ..................................... 455/556, 566, 455/346; 345/146; 348/14

[56] References Cited

U.S. PATENT DOCUMENTS

| | | | |
|---|---|---|---|
| 5,138,459 | 8/1992 | Roberts et al. | |
| 5,414,444 | 5/1995 | Britz | 345/156 |
| 5,491,507 | 2/1996 | Umezaw et al. | 455/556 |
| 5,526,411 | 6/1996 | Krieter | |
| 5,584,054 | 12/1996 | Tyneski et al. | 455/89 |
| 5,584,070 | 12/1996 | Harris et al. | 455/346 |
| 5,612,732 | 3/1997 | Yuyama et al. | 348/14 |
| 5,760,824 | 6/1998 | Hicks, III | 455/556 |

FOREIGN PATENT DOCUMENTS

| | | |
|---|---|---|
| 0 472 361 A2 | 2/1992 | European Pat. Off. |
| 2297661 | 8/1996 | United Kingdom. |
| 2301467 | 12/1996 | United Kingdom. |

OTHER PUBLICATIONS

Serial No. 08/299,399, filed Sep. 1, 1994, MNE00305–Jambhekar, et al., "Interface Card With An Electronic Camera And Method Of Use Therefor".

Serial No. 08/384,165, filed Feb. 6, 1995, CE01041R–Jambhekar, et al., "Radio Communication Device With Moveable Housing Element."

Serial No. 08/421,273, filed Apr. 13, 1995, CE01039RP01–Jambhekar, et al., "Radio Communication Device Having A Moveable Housing Element And A Keypad Disposed Therein."

"cosmic communicator: it's not pie–in–the–sky anymore." Sharp Microelectronics Group, Copyright 1993, Reader Service 13.

Sharp Electronics, "CCDs, CCD Modules and Cameras," www.sharpmeg.com, Jul. 10, 1996.

"New Products", Tokyo Business, Jan. 1996.

Nokia Press Release dated Mar. 13, 1996, www.nokia.com, Jul. 10, 1996.

"NOKIA 9000 Communicator," www.nokia.com, Jul. 10, 1996.

*Primary Examiner*—Curtis A. Kuntz
*Assistant Examiner*—Myron K. Wyche
*Attorney, Agent, or Firm*—Mark D. Patrick

[57] ABSTRACT

A communication device (104) includes two housings (108, 110), each containing circuitry (114, 115, 116, 117, 118, 122, 123) for operating the communication device (104) in different modes (700, 702, 704, 706, 730, 732). The communication device (104) includes a latch (112) for detachably coupling the two housings (108, 110) and rotating one housing (110/108) with respect to the other (108/110). The communication device (104) switches between the different modes (700, 702, 704, 706, 730, 732) based on the attachment or detachment and the relative position of the housings (108, 110).

20 Claims, 8 Drawing Sheets

HAND-HELD RADIOTELEPHONE HAVING A DETACHABLE DISPLAY

FIELD OF THE INVENTION

The present invention relates generally to a communication device and more specifically to a multi-mode communication device.

BACKGROUND OF THE INVENTION

Recently, there has been an increased demand in the marketplace for multi-mode communication devices. In response, manufacturers have proposed giving traditional audio telephones video capability. Traditional audio telephones, such as portable radiotelephones, include a user interface carried on a single housing. The user interface comprises a speaker, a microphone, a display, and a data input device, such as a keypad. These telephones are typically used to initiate a call to another user via the keypad. Once the call is initiated, the user positions the telephone in close proximity to his or her ear and mouth so as to listen to the speaker and speak into the microphone, i.e., communicate audibly, with the other user. During use, the telephone is positioned such that the user is unable to view or utilize the display.

To accommodate the video capability, it has been proposed to replace the display of the traditional audio telephone with a larger display, such as a color liquid crystal display, and mount a camera, such as a charge coupled device (CCD) camera, on the single housing in proximity to the display. It has been further proposed to enhance the microphone and speaker of the traditional audio telephone with speakerphone capability. The resulting multi-mode communication device allows the user to hold the communication device away from his or her head and communicate with another user both audibly via the enhanced microphone and speaker and visually via the larger display and camera. Unfortunately, such a device must have a single surface that is at least large enough to carry the larger display, camera, and enhanced speaker and microphone. This results in a dimensionally larger device. Also, the speakerphone enhancement prevents the user from positioning the device in close proximity to his or her ear and mouth to, for example, communicate in privacy or in the presence of loud ambient noise.

Other proposed multi-mode communication devices combine a portable radiotelephone with a personal digital assistant. In a first mode of operation, the device operates as a conventional radiotelephone. In a second mode of operation, a personal digital assistant mode, the device permits the user to, for example, write and store notes, view previously stored notes, fax a note, send a note via electronic mail, and/or access the Internet. In an overlapping mode, while viewing a stored note in the personal digital assistant mode, a user can place a radiotelephone call and view the note during the call. However, this device employs at least two displays and two keypads—one display and keypad for use primarily in the radiotelephone mode and the other display and keypad for use primarily in the personal digital assistant mode. Such redundancy adds sufficient size and cost to the device.

Therefore, what is needed is a multi-mode communication device that permits a user to communicate in privacy and employs a single user interface having components carried on multiple surfaces of the device so as to minimize the size and cost of the device.

DETAILED DESCRIPTION OF THE PREFERRED EMBODIMENTS

A communication device includes two housings, each containing circuitry operable when the communication device is in different modes. The communication device includes a latch for detachably coupling the two housings and permitting rotation of one housing with respect to the other. When the housings are attached and in a first alignment, the device operates in one mode. When the housing are attached and in a second alignment, the device operates in another mode. When the housings are detached, the device operates in yet another mode. By permitting detachment, the housings can be separately positioned as desired by a user. Also, user interface components of the communication device need not be positioned along a single surface of the device; thereby, helping to reduce the size of the device without reducing the device's utility.

Figure 1:
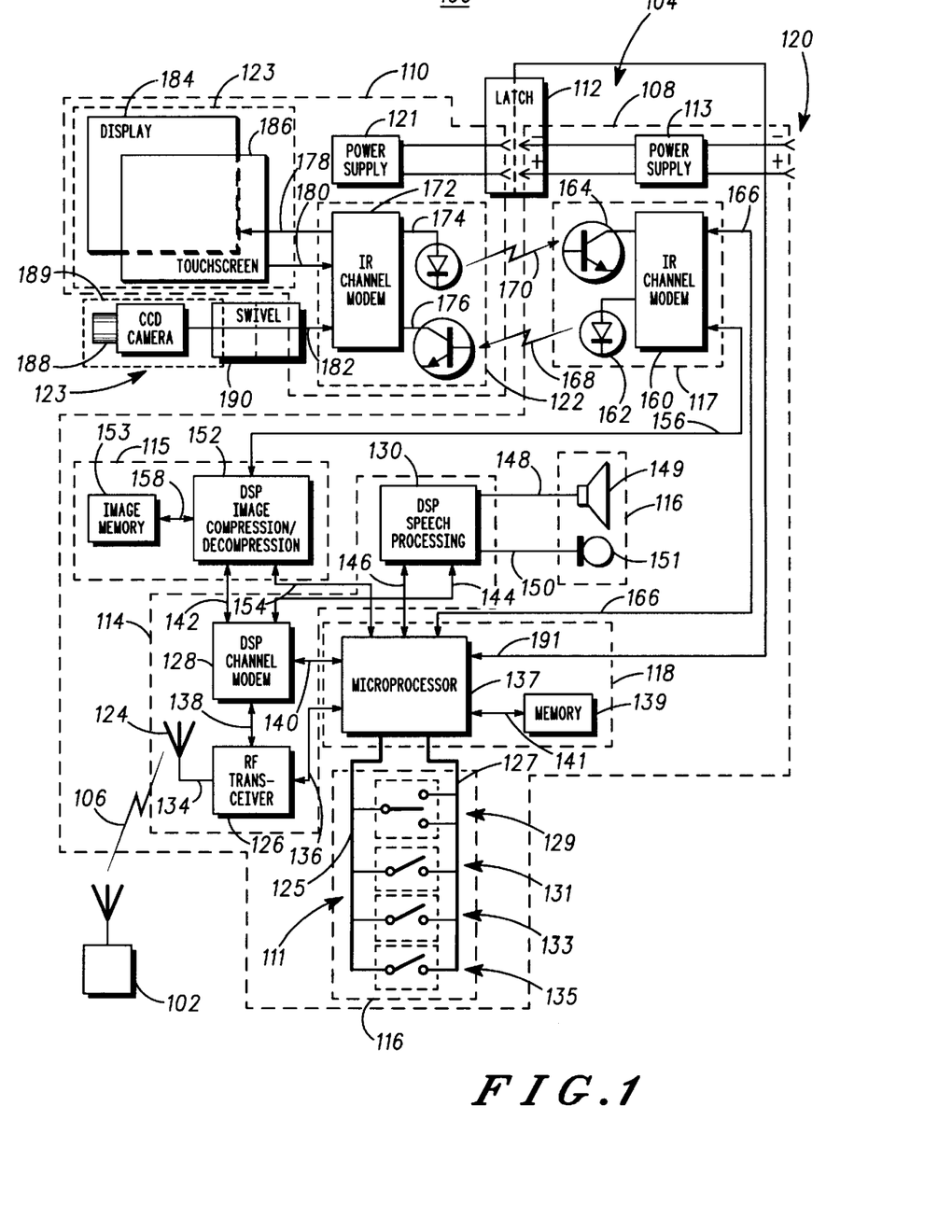
FIG. 1 is a circuit block diagram illustrating a communication system.

The communication system 100 of FIG. 1 includes communication devices 102 and 104 that communicate over a communication link 106. The communication device 104 can be a wireless device, such as a cellular radiotelephone, a cordless telephone, a two-way radio, a modem, or the like, or the device can be a landline communication device, such as a telephone, a modem, a data terminal, or the like. The communication device 102 is any device compatible with the communication device 104, such as a dispatch center, a cellular base station, a cordless base, another telephone, a computer, or the like.

The communication link 106 can be a wireless connection or a wireline connection, such as a twisted wire pair, a coaxial cable, or the like. The communication link 106 supports data communications between the communication devices 102 and 104. Such data communications include cellular radiotelephone service, paging service, two-way radio service, electronic mail service, wireless fax service, short message service, or the like. In the illustrated embodiment, data is communicated via the wireless communication link 106 as radio frequency (RF) signal energy.

The communication device 104 includes a first portion of circuitry housed in a first housing 108 The first portion of circuitry comprises radio circuitry 114, image circuitry 115, a first user interface 116, and a first wireless data transceiver 117. The wireless data transceiver 117 is for communicating with a second portion of circuitry primarily housed in a second housing 110. The second portion of circuitry comprises a second wireless data transceiver 122, for communicating with the first wireless data transceiver 117, and a second user interface 123. A latch 112 detachably couples the housings 108 and 110. A controller 118 disposed in the housing 108 operates the communication device 104 in different modes responsive to signals generated by the latch 112, signals received from the communication device 102, and other signals input to the communication device 104 as described hereinbelow.

The communication device 104 includes power supplies 113 and 121. Although the individual connections are not shown, the power supply 113 supplies power to the circuitry of the housing 108. The power supply 113 is coupled to the power supply 121 through the latch 112, and to electrical contacts 120 carried on the housing 108. The power supply 121 supplies power to the circuitry of the housing 110. The power supplies 113 and 121 are preferably rechargeable batteries, but the power supply 113 can be a power regulator coupled to a conventional main power supply (e.g., a wall outlet alternating current power supply) and the power supply 121 can be a rechargeable battery charged by the power regulator of the power supply 113. Alternately, the power supplies 113 and 121 can be disposable batteries, or the like.

The radio circuitry 114 of the housing 108 includes an antenna 124, a RF transceiver 126, a channel modem digital signal processor (DSP) 128, and a speech processing DSP 130. The radio circuitry 114 and the controller 118 collectively comprise a radiotelephone. The antenna 124 receives incoming RF signals of the communication link 106 and converts the incoming RF signals into electrical receive signals output on wire 134. Electrical transmit signals on wire 134 are emitted by the antenna 124 as outgoing RF signals of the communication link 106.

The RF transceiver 126 is coupled to the antenna via wire 134 and the controller 118 via bus 136. The RF transceiver 126, in response to control signals on bus 136, filters and steps down the electrical receive signals on wire 134 into electrical receive signals output on bus 138. The RF transceiver 126 is responsive to control signals on bus 136 to filter and amplify electrical transmit signals on bus 138 for emission by the antenna 124 via wire 134.

The channel modem DSP 128 is coupled to the RF transceiver 126 via bus 138 and to the controller 118 via bus 140. The channel modem DSP 128, in response to control signals on bus 140, demodulates and decodes electrical receive signals on bus 138 into receive compressed image data, receive speech data, or receive control data output on busses 142, 144, and 140, respectively. The channel modem DSP 128 is responsive to control signals on bus 140 to encode and modulate transmit compressed image data, transmit speech data, and/or transmit control data on busses 142, 144, 140, respectively, into electrical transmit signals on bus 138.

The speech processing DSP 130 is coupled to the channel modem DSP 128 via bus 144 and to the controller 118 via bus 146. The speech processing DSP 130, in response to control signals on bus 146, processes the receive speech data on bus 144 into electrical speech signals on wire 148. The speech processing DSP 130 is responsive to control signals on bus 146 to process electrical speech signals on wire 148 into transmit speech data on bus 144.

The user interface 116 of the housing 108 includes a speaker 149 and a microphone 151. The speaker 149 is coupled to the speech processing DSP 130 via wire 148. The speaker 149 transduces electrical speech signals on wire 148 into audible voice signals. Such signals can also constitute an audible alert to signal an incoming call. The microphone 151 is coupled to the speech processing DSP 130 via wire 150. The microphone 151 transduces audible voice signals into electrical speech signals on wire 150. The speaker 149 and the microphone 151 are implemented using any suitable commercially available audio transducers.

The image circuitry 115 includes an image DSP 152 and an image memory 153. The image DSP 152 is coupled to the channel modem DSP 128 via bus 142 and the controller 118 via bus 154. The image DSP 152, in response to control signals on bus 154, decompresses receive compressed image data on bus 142 into receive decompressed image data on bus 156, decompresses compressed image data on bus 158 into receive decompressed image data on bus 156, and/or couples receive compressed image data on bus 142 to bus 158 as compressed image data. It will be recognized that decompressed image data refers to image data that was once, but no longer, compressed and image data that was never compressed. The image DSP 152 is responsive to control signals on bus 154 to compress transmit decompressed image data on bus 156 into transmit compressed image data on bus 142, compress transmit decompressed image data on bus 156 into compressed image data on bus 158, and/or couple compressed image data on bus 158 to bus 142 as transmit compressed image data. The image DSP 152 employs a conventional algorithm, such as the Motion Picture Experts Group (MPEG) algorithm available from C-Cube Inc.

The channel modem DSP 128, the speech processing DSP 130, and the image DSP 152 can be implemented using one, two, or more DSPs of the type that are commercially available. Alternatively, one or more microprocessors may be used.

The image memory 153 is coupled to the image DSP 152 via bus 158. The image memory 153 stores compressed image data received on bus 158. The image memory 153 permits retrieval of compressed image data by the image DSP 152 via bus 158. The image memory 153 is implemented using any suitable memory device such as a random access memory (RAM), an electrically erasable programmable read-only memory (EEPROM), or the like. The image memory 153 may be integral with the circuit used for the image DSP 152.

The wireless data transceiver 117 includes an infrared (IR) channel modem 160, an IR emitter 162 coupled to an output of the IR channel modem 160, and an IR detector 164 coupled to an input of the IR channel modem 160. The IR channel modem 160 is coupled to the image DSP 152 via bus 156 and the controller 118 via bus 166. The IR channel modem 160, in response to control signals on bus 166, encodes and modulates receive decompressed image data received on bus 156 and forward control data received on bus 166 into a forward communication signal 168. The IR channel modem then drives the IR emitter 162 to transmit the forward communication signal 168. The IR channel modem 160 is responsive to control signals on bus 166 to permit reception of a backward communication signal 170 via the IR detector 164. The IR channel modem 160 demodulates and decodes the backward communication signal 170 into transmit decompressed image data on bus 156 and backward control data on bus 166. The IR emitter 162 can be implemented using a commercially available photodiode. The IR detector 164 can be implemented using a commercially available photodetector. The IR channel modem 160 can be implemented using appropriate analog and digital processing circuitry, such as that defined by IrDA (Infrared Data Association).

The wireless data transceiver 122 includes an IR channel modem 172, an IR emitter 174 coupled to an output of the IR channel modem 172, and an IR detector 176 coupled to an input of the IR channel modem 172. The wireless data transceiver 122 is compatible with the wireless data transceiver 117. The IR channel modem 172 demodulates and decodes the forward communication signal 168 received via the IR detector 176 into receive decompressed image data and forward control data on busses 178 and 182. The IR channel modem 172 encodes and modulates transmit decompressed image data on busses 180 and 182 and backward control data on bus 180 into the backward communication signal 170. The IR channel modem 172 drives the IR emitter 162 to transmit the backward communication signal 170. The IR channel modem 172 may alternatively route transmit decompressed image data directly from bus 182 to bus 178 in response to forward control data. The IR emitter 174, IR detector 176, and the IR channel modem 172 can be implemented using circuit elements similar to those of the wireless data transceiver 117.

Although the illustrated communication between the housings 108 and 110 is accomplished via a wireless IR link, it will be recognized that the wireless data transceivers 117 and 122 can alternatively communicate via a wireless RF link or any other suitable wireless means. The wireless IR link transmits data at a rate of approximately 1 Mbit/sec to enable full motion video.

The user interface 123 includes a display 184 employing a touch sensitive screen (touchscreen) 186 and a charge coupled device (CCD) camera 188. The display 184 is coupled to the IR channel modem 172 via bus 178. The touchscreen 186 is coupled to the IR channel modem 172 via bus 180. The display 184 and the touchscreen 186 are configured by forward control data received on bus 178. Once configured, the display 184 displays receive decompressed image data and forward control data received on bus 178. Upon actuation, the touchscreen 186 produces both transmit decompressed image data and backward control data, such as mode selection data, on bus 180. The display 184 and the touchscreen 186 can be any conventional integrated display and touchscreen, such as those commercially available from Epson.

The CCD camera 188 of FIG. 1 is electrically coupled to the IR channel modem 172 via bus 182. The CCD camera 188 captures an image and outputs the image as receive decompressed image data on bus 182. The CCD camera 188 is housed in a third housing 189 coupled to the housing 110 via a swivel 190. The swivel 190 permits passage of the bus 182 therethrough so as to electrically connect the CCD camera 188 and the IR channel modem 172. The CCD camera 188 can be any conventional CCD camera, such as those manufactured and sold by Sharp.

The latch 112 physically couples the housings 108 and 110. The latch 112 permits rotation of, and detachment of, the housings 108 and 110. The latch 112 is electrically coupled to the controller 118 via bus 191. The latch 112 provides signals on the bus 191 indicating the position of the housing 110 relative to the housing 108 when the housings 108 and 110 are attached. The latch 112 provides signals on the bus 191 indicating detachment of the housings 108 and 110, when the housings are detached. The latch 112 is described in greater detail hereinbelow.

The user interface 116 of the housing 108 also includes a plurality of actuatable switches 111. The switches 111 are coupled to the controller 118 by busses 125 and 127. Each terminal of the switches 111 is coupled to the controller 118 by a respective wire of bus 127. Bus 125 can be a single wire having a predetermined voltage thereon. Upon closure of one of the switches 111, a voltage on the bus 125 is transferred to a respective wire on bus 127 for sensing by the controller 118. The plurality of switches 111 includes a toggle switch 129, which is illustrated to be a double throw switch, a power switch 131, a photo switch 133, and a video switch 135.

The controller 118 can be implemented using a microprocessor 137 and a memory 139, a microprocessor having internal memory, a DSP, a programmable logic unit, or the like. The microprocessor 137 is coupled to the RF transceiver 126, the channel modem DSP 128, the speech processing DSP 130, the image DSP 152, the wireless data transceiver 117, the user interface 116, the latch 112, and the memory 139 via busses 136, 140, 146, 154, 166, 125, 127, 191, and 141, respectively. The microprocessor 137 is any suitable commercially available microcontroller or microprocessor, such as a 68332 microprocessor manufactured and sold by Motorola, Inc. The channel modem DSP 128, the speech processing DSP 130, and the image DSP 152 can be integrated with, or separate from, the controller 118. The memory 139 is an EEPROM, an erasable programmable read-only memory (EPROM), a random access memory (RAM), and/or any other suitable memory. The microprocessor 137 configures the display 184 and the touchscreen 186 with forward control signals output on bus 166. The forward control signals comprise data read from the memory 139 by the microprocessor 137 via bus 141. The microprocessor 137 is responsive to the position signal on bus 191 and mode selection data of backward control signals on bus 166 to control the communication device 104 to operate in any of a plurality of different modes.

Figure 2:
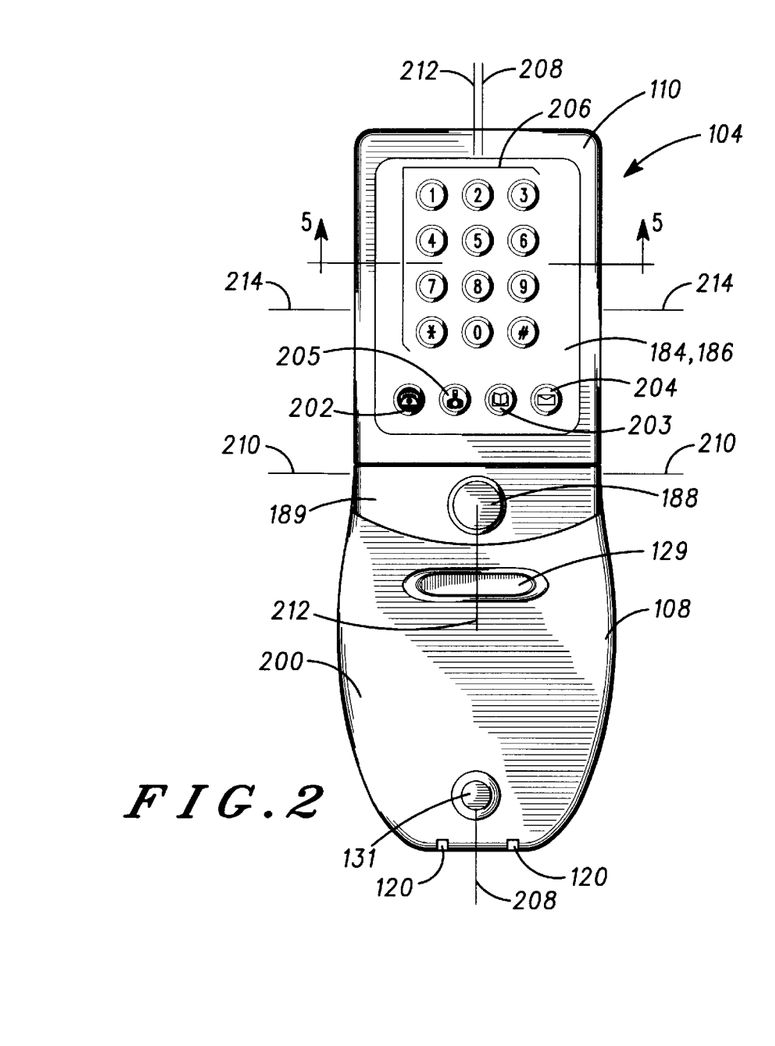
FIG. 2 is a front elevational view illustrating a communication device used in the communication system of FIG. 1 in a telephone mode.

FIG. 2 illustrates that the housings 108 and 110 form a front surface 200 of the communication device 104. The housing 108 includes a longitudinal axis 208 and a transverse axis 210. The toggle switch 129 and the power switch 131 are disposed on the front surface 200 attributable to the housing 108. Actuation of the right side of the toggle switch 129 closes the double throw switch of FIG. 1 on the upper contact, while actuation of the left side of the toggle switch 129 closes the double throw switch on the lower contact. Actuation of the power switch 131 powers on the communication device 104 with the power supplies 113 and 121 of FIG. 1. The contacts 120 are disposed at a bottom of the housing 108, best seen in FIG. 2. The housing 110 includes a longitudinal axis 212 and a transverse axis 214. The display 184 and the touchscreen 186 are coextensive and comprise a majority of the front surface 200 attributable to the housing 110, thereby providing a relatively large area for viewing image data and inputting information. The front surface 200 attributable to the housing 189 includes a lens of the CCD camera 188.

Figure 3:
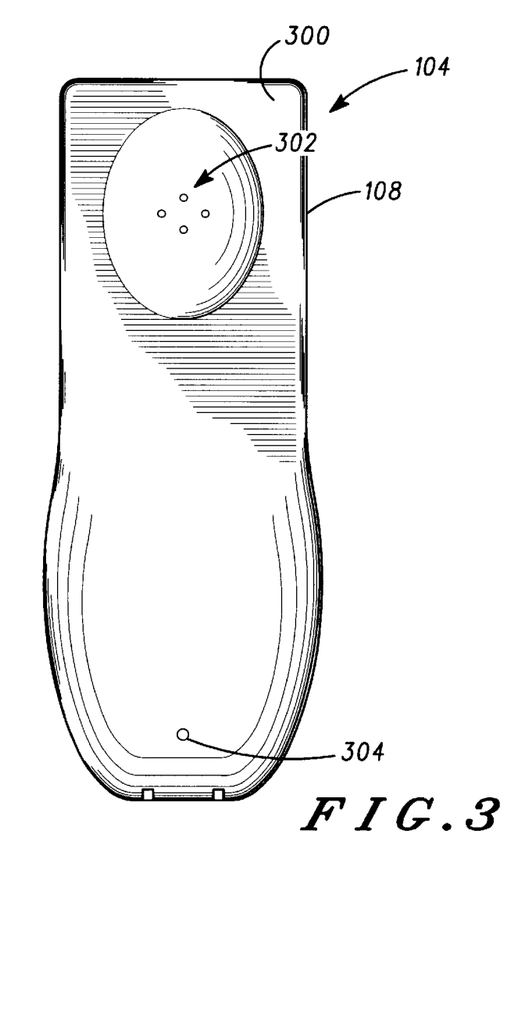
FIG. 3 is a rear elevational view illustrating the communication device of FIG. 2.

The rear surface 300 (FIG. 3) of the communication device includes a plurality of openings 302 disposed in proximity to a top end. An opening 304 is disposed in proximity to a bottom end, opposite the top end. The speaker 149 of FIG. 1 is positioned behind the plurality of openings 302. The microphone 151 of FIG. 1 is disposed behind the opening 304. A user can place the rear surface 300 of the communication device 104 in close proximity to their head such that the plurality of openings 302 is juxtaposed with an ear and the opening 304 is juxtaposed with the mouth. In this position, the communication device 104 may be positioned in the manner of conventional telephone handsets for use in a telephone call.

Figure 4:
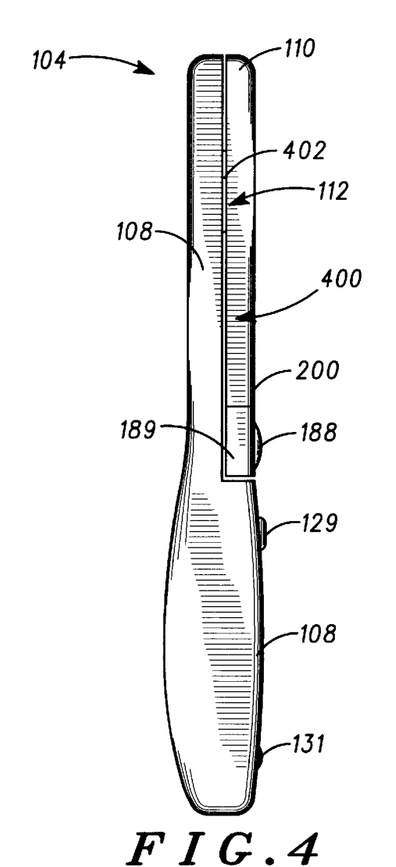
FIG. 4 is a left side elevational view illustrating the communication device of FIG. 2.

With the housing 110 positioned in a recess 400 of the housing 108, the front surface 200 of the communication device 104 is substantially planar across the entire communication device 104, as best seen in FIG. 4. The housing 110 is held in the recess 400 by the latch 112, of which a turret 402 of the latch 112 is shown to extend from the housing 108 and into the recess 400.

Figure 5:
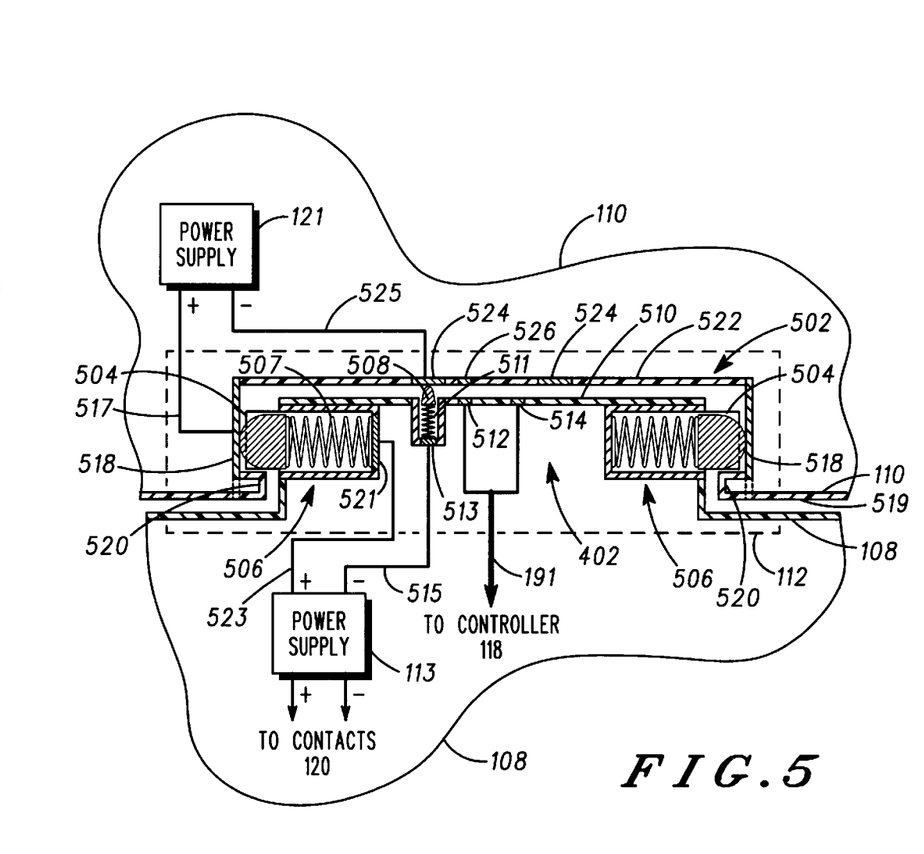
FIG. 5 is a fragmentary cross sectional view illustrating the communication device of FIG. 2 taken across section lines 5—5 of FIG. 2 and with circuitry shown schematically.
Figure 6:
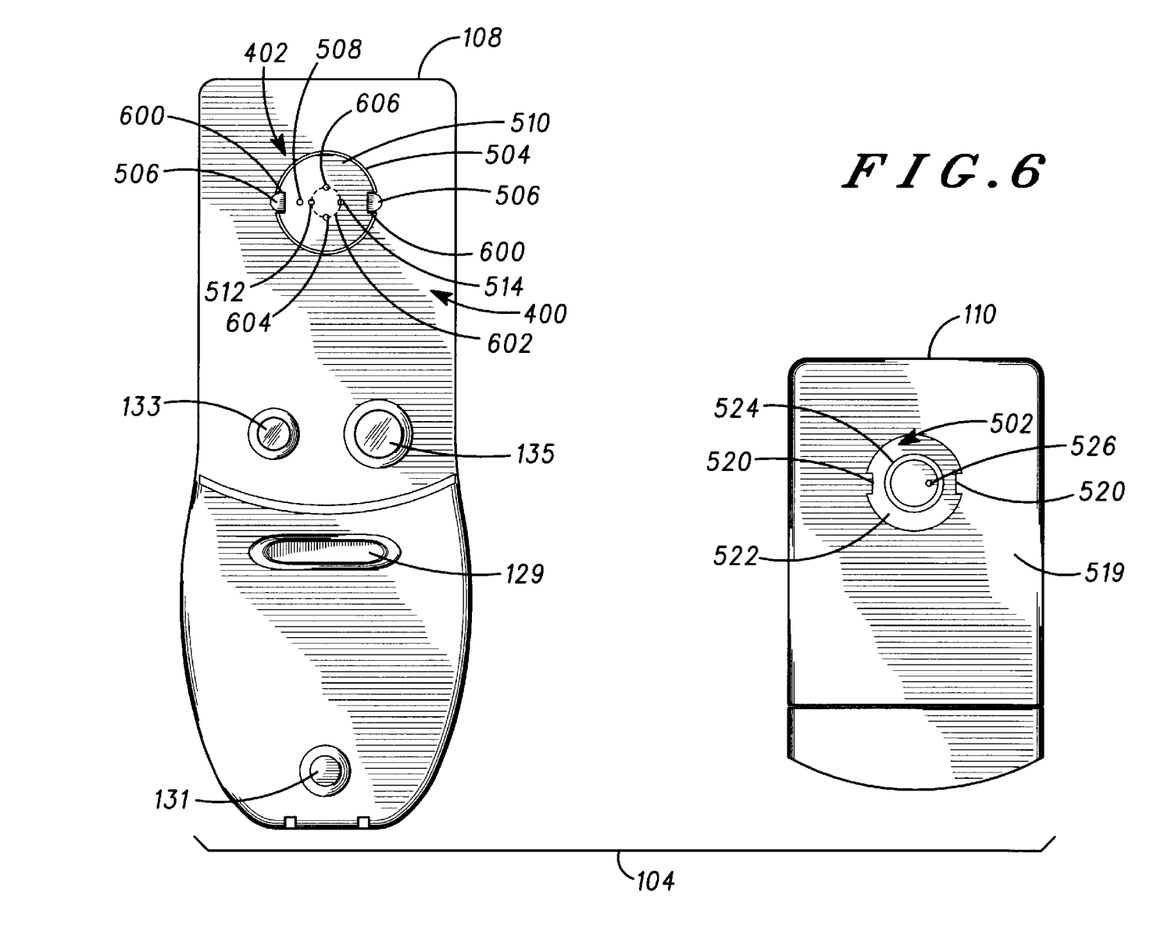
FIG. 6 is a front elevational view illustrating a first housing of the communication device of FIG. 2 and a rear elevational view of a second housing of the communication device of FIG. 2 detached from the first housing.

FIGS. 5 and 6 illustrate that the turret 402 of the latch 112 carried on the housing 108 mates with a sleeve 502 of the latch 112 carried on the housing 110. The turret 402 employs a ledge 504. The ledge 504 encircles the turret 402. The ledge 504 includes a pair of opposing slots 600, each fitted with a spring-loaded ball plunger 506. One of the ball plungers 506 is an electrically conductive member electrically connected to a positive terminal (+) of the power supply 113 via an electrically conductive spring 507, a conductive contact 521, and a wire 523. The ball plungers 506 are outwardly biased with respect to the turret 402.

The turret 402 further includes a spring-loaded finger 508 positioned at a top surface 510 thereof. The spring-loaded finger 508 is an electrically conductive member electrically connected to a negative terminal (−) of the power supply 113 via an electrically conductive spring 511, a conductive contact 513, and a wire 515. The spring-loaded finger 508 is biased to extend outwardly with respect to the turret 402.

The turret 402 also includes sensors 512, 514, 604, and 606 positioned along a circular path 602 in the top surface 510. The sensors 512, 514, 604, and 606 are preferably magnetic reedswitches. The sensors 512, 514, 604, and 606 are electrically connected to the controller 118 via individual wires of the bus 191, as exemplified by sensors 512 and 514 in FIG. 5. When triggered, the sensors 512, 514, 604, and 606 output a logic high level signal by connecting a potential from the power supply 113 to the controller 118 via their respective wires of the bus 191. When untriggered, the sensors 512, 514, 604, and 606 do not output a logic high level signal and their respective wires of the bus 191 remain at a logic low level.

The sleeve 502 is integrally formed in a rear surface 519 of the housing 110. The sleeve 502 includes an electrically conductive cylindrical wall 518. The wall 518 is electrically coupled to a positive terminal (+) of the power supply 121 by wire 517. The sleeve 502 includes a pair of flanges 520 that are not electrically conductive and are disposed to extend inward from the wall 518 at opposing locations thereof. The flanges 520 can be integrally molded with the housing 110. A top surface 522 of the sleeve 502 includes a conductive ring 524 that is electrically coupled to a negative terminal (−) of the power supply 121 via wire 525. The top surface 522 includes a trigger 526, such as a magnet, for actuating the sensor 512, 514, 604, or 606 when aligned therewith.

The housings 108 and 110 are movably attached by the latch 112. Upon aligning the flanges 520 of the sleeve 502 with the slots 600 and ball plungers 506 of the turret 402, the housing 110 is pressed against the housing 108. The flanges 520 impart a horizontal force on the ball plungers 506 and causes the ball plungers 506 to retract into the turret 402. Once the flanges 520 clear the ball plungers 506, the ball plungers 506 expand outward from the turret 402 and engage the wall 518 of the sleeve 502. This locks the flanges 520 between the ball plungers 506 and the housing 108. The spring, such as spring 507, disposed in each ball plunger 506 will remain partially compressed to ensure an electrical connection between the positive terminals of the power supplies 113 and 121. Also during assembly, the top surface 522 of the sleeve 502 becomes juxtaposed with the top surface 510 of the turret 402. The ring 524 of the sleeve 502 engages, and partially retracts, the spring-loaded finger 508 of the turret 402. The spring disposed in the finger 508 remains partially compressed when contacting the ring 524 to ensure an electrical connection between the negative terminals of the power supplies 113 and 121. The spring force exerted by the finger 508 is comparatively small relative to that exerted by the ball plungers 506. This prevents the finger 508 from pushing the turret 402 out of the sleeve 502.

Once assembled, the axes of the housing 110 are aligned with the axes of the housing 108, as shown in FIG. 2. In this orientation, the longitudinal axes 208 and 212 of the housings 108 and 110, respectively, and the transverse axes 210 and 214 of the housings 108 and 110, respectively, are parallel. The sensor 512 of the turret 402 is actuated by the trigger 526, as shown in FIG. 5, and outputs the logic high level signal to the controller 118 via its respective wire of the bus 191. The sensors 514, 604, and 606 are untriggered and their respective wires of the bus 191 remain at a logic low level.

Figure 12:
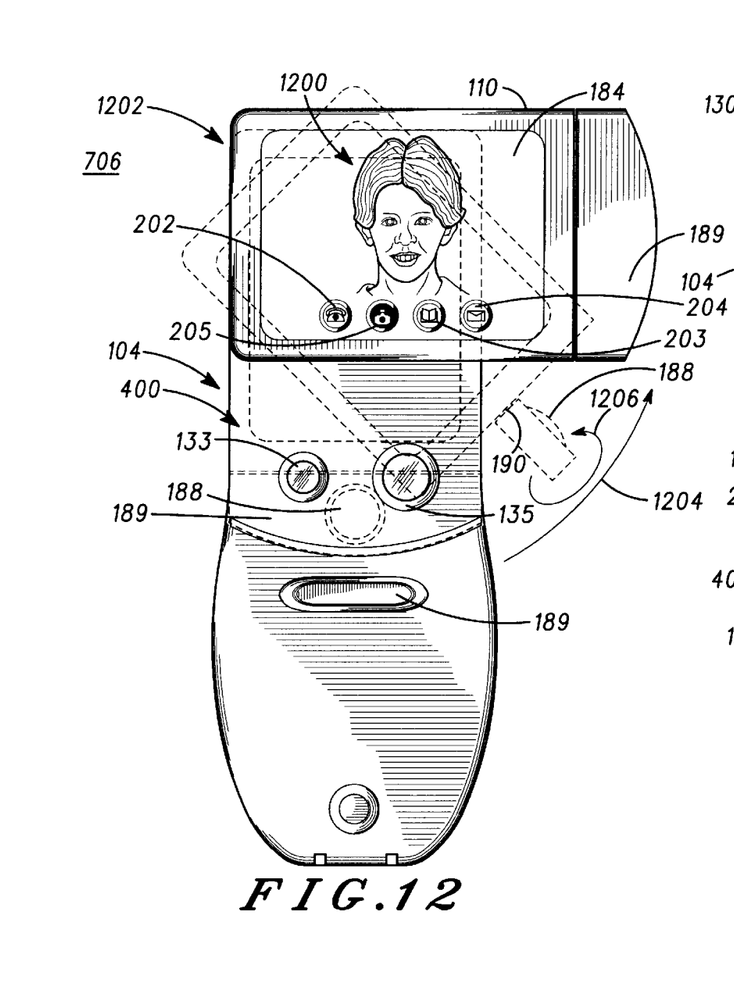
FIG. 12 is a front elevational view illustrating the communication device of FIG. 2 in a camera mode, a camera of the communication device being rotated to face backward.

The housing 108 can be rotated ninety degrees to a ninety degree orientation, as shown in FIG. 12. As the housing 110 is rotated, the flanges 520 of the sleeve 502 are drawn under the ledge 504 of the turret 402. During rotation, the ball plungers 506 of the turret 402 maintain contact with the wall 518 of the sleeve 502. Also, the spring-loaded finger 508 of the turret 402 travels about, and maintains contact with, the ring 524 of the sleeve 502. The trigger 526 travels along the path 602.

In the ninety degree orientation, the longitudinal axis 212 (FIG. 2) of the housing 110 is perpendicular to the longitudinal axis 208 of the housing 108. The transverse axis 214 of the housing 110 is perpendicular to the transverse axis 210 of the housing 108. The sensor 604 is aligned with the trigger 526 and outputs the high logic level signal to the controller 118 via its respective wire of the bus 191. In this orientation, the sensors 512, 514, and 606 are untriggered and their respective wires of the bus 191 remain at a logic low level.

Figure 13:
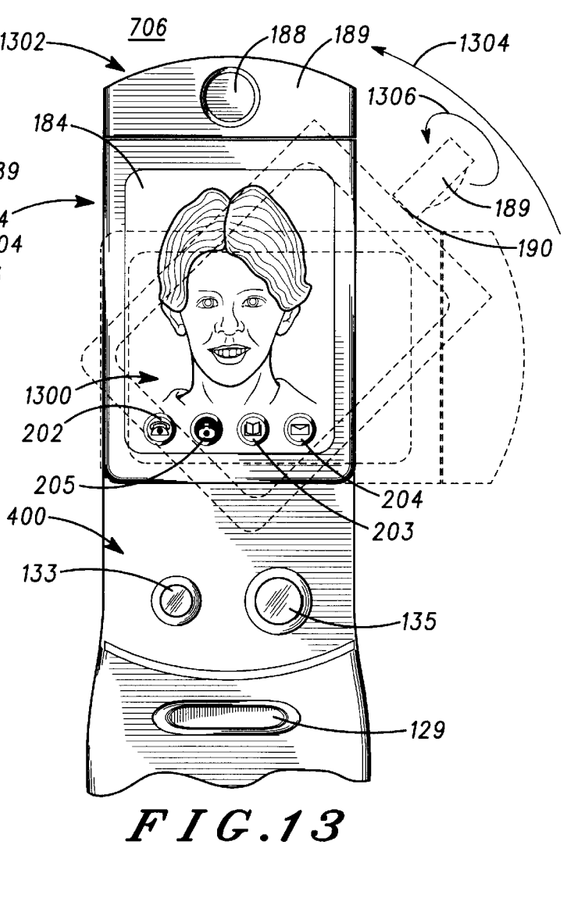
FIG. 13 is a fragmentary front elevational view illustrating the communication device of FIG. 1 in the camera mode, the camera of the communication device being rotated to face forward.

From the ninety degree orientation, the housing 110 can be further rotated ninety degrees in either the counterclockwise direction to a 180 degree orientation shown in FIG. 13 or a clockwise direction back to the orientation shown in FIG. 2. In the 180 degree orientation, only sensor 514 is aligned with the trigger 526 and outputs the high logic level signal on its respective wire of the bus 191. From the 180 degree orientation, the housing 110 can be rotated another ninety degrees in either the counterclockwise direction to a 270 degree orientation or a clockwise direction back to the ninety degree orientation. In the 270 degree orientation, the housing 110 can be rotated another ninety degrees in either the counterclockwise direction to the orientation shown in FIG. 2 or a clockwise direction back to the 180 degree orientation. In the 270 degree orientation, only sensor 606 is aligned with the trigger 526 and outputs the logic high level signal on its respective wire of the bus 191.

To detach the housings 108 and 110, the housing 110 is rotated to the orientation shown in FIG. 2 such that the flanges 520 reside under the ball plungers 506 and the trigger 526 is aligned with sensor 512, as shown in FIG. 5. Detachment is accomplished by pulling the housings 108 and 110 apart with a force that is sufficient to cause the flanges 520 to retract, and move past, the ball plungers 506. Once detached, all of the sensors 512, 514, 604, and 606 are untriggered and all wires of the bus 191 are at the logic low level. Also, the electrical connection between the power supplies 113 and 121 is broken such that the circuitry in the housing 110 is solely powered by the power supply 121.

Figure 7:
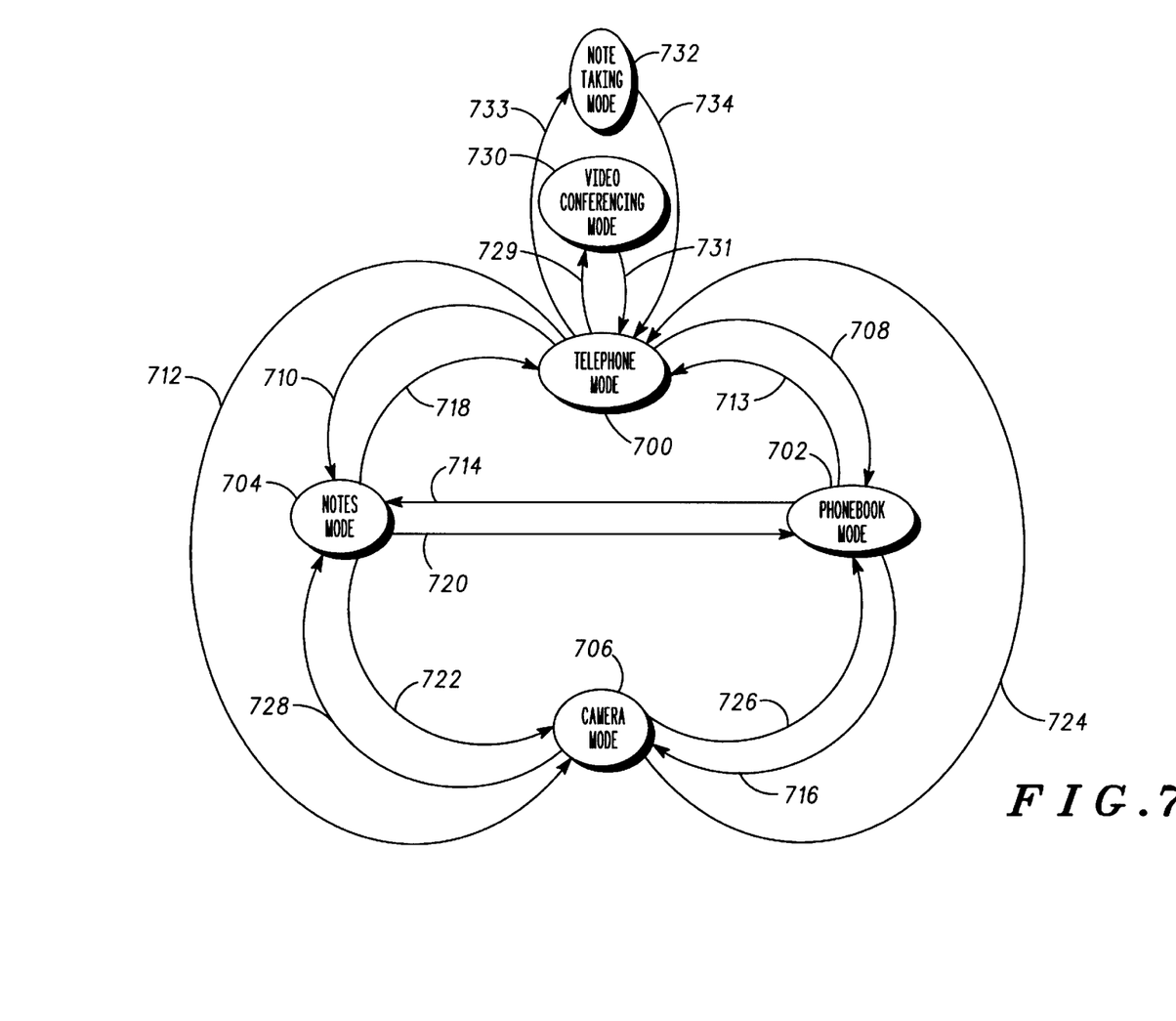
FIG. 7 is a state diagram illustrating different modes of operation of the communication device of FIG. 2.
Figure 10:
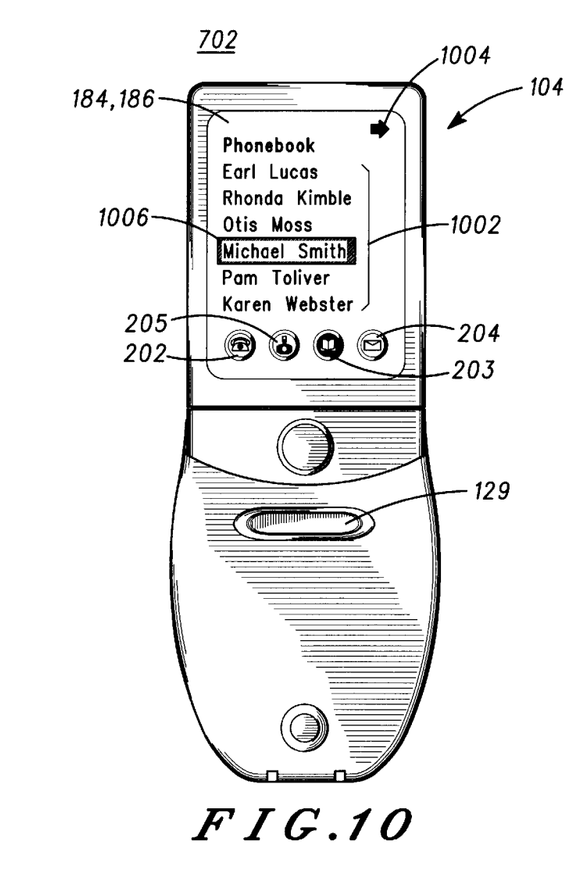
FIG. 10 is a front elevational view illustrating the communication device of FIG. 2 in a phonebook mode.

Upon detection of actuation of the power switch 131 on bus 127 and detection of the logic high level signal from the sensor 512 on the bus 191 from positioning the housings 108 and 110 as shown in FIG. 2, the controller 118 powers on, and configures, the communication device 104 in a telephone mode 700 of FIG. 7. In this mode, the controller 118 configures the display 184 (FIG. 2) to display a telephone keypad 206, a darkened telephone softkey 202, a phonebook softkey 203, a notes softkey 204, and a camera softkey 205. Telephonic communication is initiated via reception of a call or placement of a call. An incoming call is received by the user touching the touchscreen 186 at the telephone softkey 202 in response to an incoming call alert from the speaker 149 of FIG. 1. A call is placed by touching the display 184 at the numbers of the telephone keypad 206 to enter a desired phone number. Alternatively, placement of a call using a stored telephone number can be performed via a phonebook mode 702 (FIG. 7), as is discussed in greater detail with respect to FIG. 10 below.

Upon detection, during a call, of detachment of the housings 108 and 110 from the logic low level on all wires of the bus 191 and touching the touchscreen 186 at the camera softkey 205 via bus 166, the controller 118 configures the communication device in a video conferencing mode 730 of FIG. 7. The transition from the telephone mode 700 to the video conferencing mode 730 is represented by arrow 729.

Figure 8:
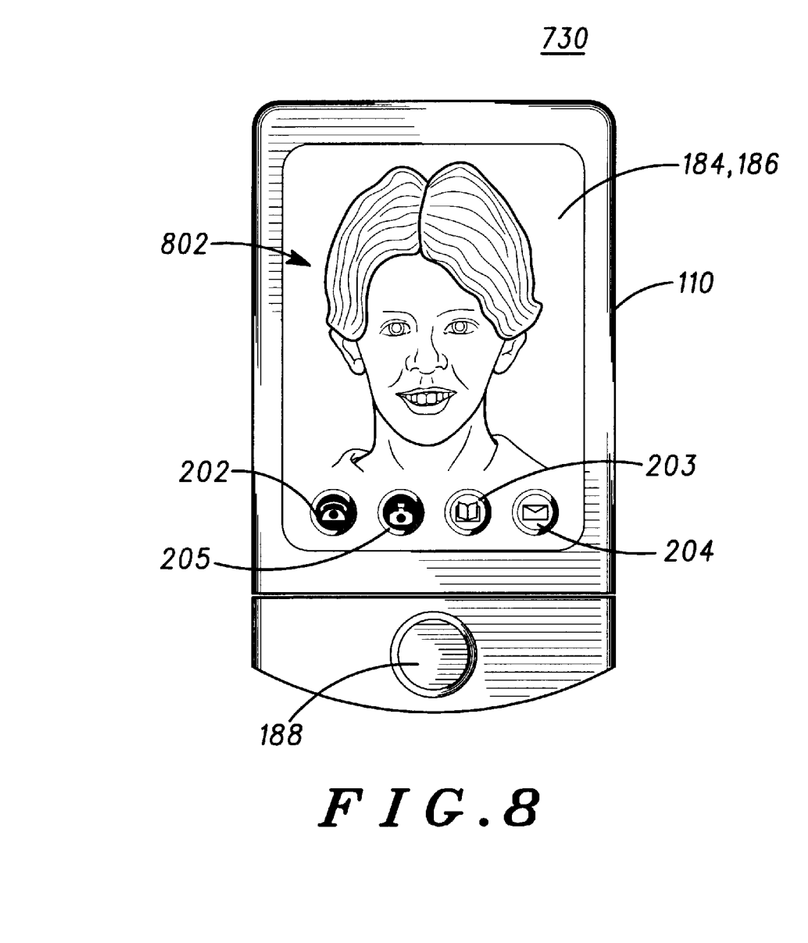
FIG. 8 is a front elevational view illustrating the second housing of the communication device of FIG. 2 in a video conferencing mode.

In the video conferencing mode 730, the controller 118 configures the display 184 (FIG. 8) to display the softkeys 202–205 with the telephone softkey 202 and the camera softkey 205 darkened. The controller 118 displays a second user 802, with which the instant user is telephonically communicating, on the display 184. In this mode, the housing 110 can be positioned a distance from the housing 108. This permits viewing of the second user 802 on the display 184 and aiming of the CCD camera 188 for capture of the instant user's image for transmission to, and similar viewing by, the second user 802 while the housing 108 is positioned against the user's head. In noisy environments, or where privacy is desired, audible communication via the speaker 149 and the microphone 151 are enhanced by close positioning of the housing 108 while viewing and image capture is enhanced by the remote positioning of the second housing 110. Upon detection of touching the touchscreen 186 at the telephone softkey 202 via bus 166, the controller 118 returns the communication device 104 to the telephone mode 700 (FIG. 7). The transition from the video conferencing mode 730 to the telephone mode 700 is represented by arrow 731.

Upon detection, during a call, of detachment of the housings 108 and 110 from the logic low level on all wires of the bus 191 and touching the touchscreen 186 at the notes softkey 204 via bus 166, the controller 118 configures the communication device in a note taking mode 732 of FIG. 7. The transition from the telephone mode 700 to the note taking mode 732 is represented by arrow 733.

Figure 9:
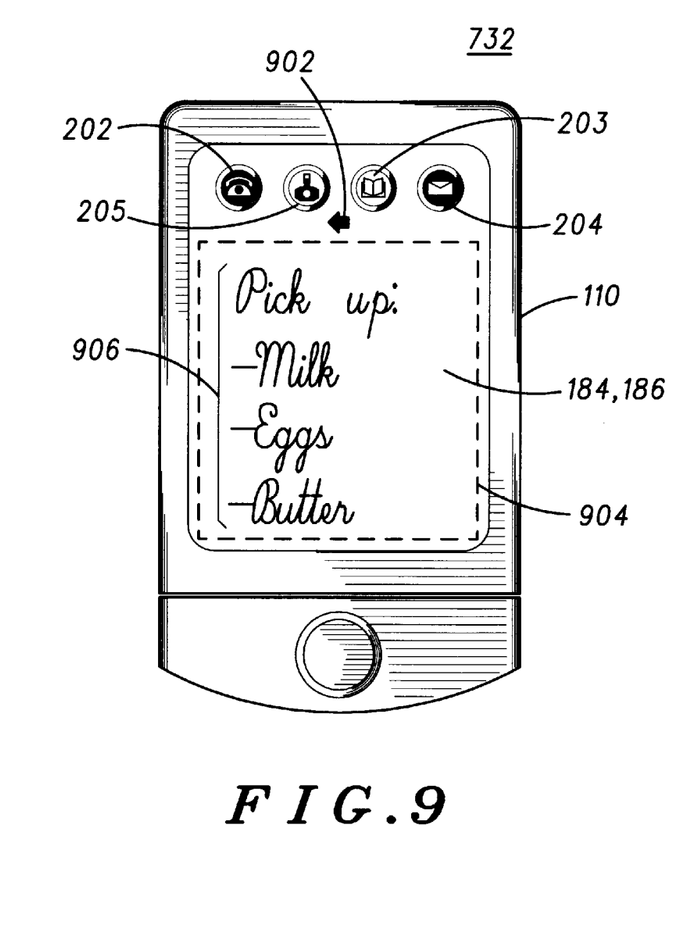
FIG. 9 is a front elevational view illustrating the second housing of the communication device of FIG. 2 in a note taking mode.
Figure 11:
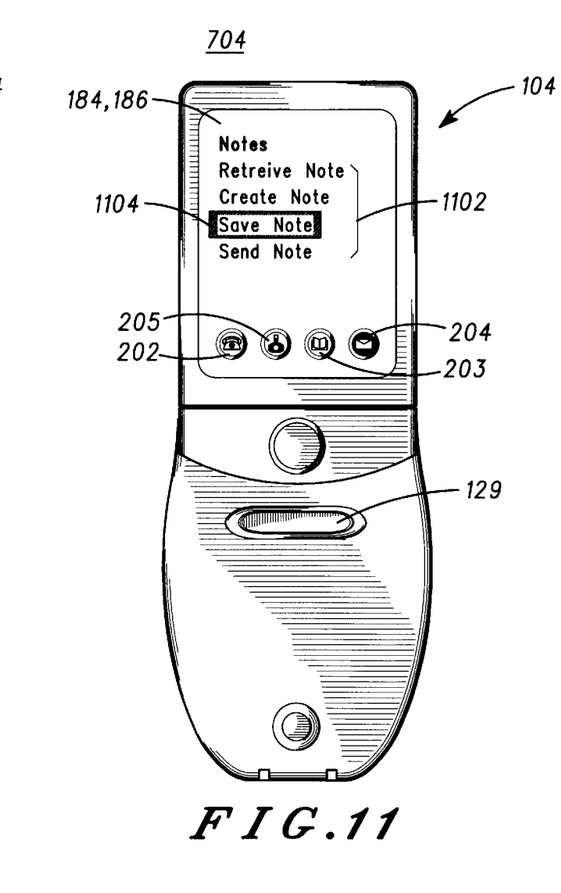
FIG. 11 is a front elevational view illustrating the communication device of FIG. 2 in a notes mode.

In the note taking mode 732, the controller 118 configures the display 184 (FIG. 9) to display a menu level icon 902, provide a tablet area 904, and display the softkeys 202–205 with the telephone softkey 202 and the notes softkey 204 darkened. In this mode, the housing 110 can be positioned a distance from the housing 108. For example, the housing 110 can be positioned on a table while the housing 108 is positioned against the user's head. This facilitates entry of a handwritten note 906 on the tablet area 904 of the touchscreen 186 of the housing 110 while the housing 108 is positioned along between the user's ear and mouth to permit audible communication via the speaker 149 and the microphone 151. The handwritten note 906 is written by writing on the tablet area 904 of the touchscreen 186 with a stylus or other suitable device. Upon detection of touching the touchscreen 186 at the menu level icon 902 via bus 166, the controller 118 reconfigures the display 184 to display additional functions of the communication device 104 for accessing. For example, actuation of the menu level icon 902 can access the notes mode 704 of FIG. 7, which allows storage of the handwritten notes or creation of additional notes, as described in greater detail with respect to FIG. 11 below. Upon detection of touching the touchscreen 186 at the telephone softkey 202 via bus 166, the controller 118 returns the communication device 104 to the telephone mode 700 (FIG. 7). The transition from the note taking mode 732 to the telephone mode 700 is represented by arrow 734.

Upon detection of touching the touchscreen 186 at the telephone softkey 202 via bus 166, the controller 118 terminates an active call in the telephone mode 700. Upon detection of touching the touchscreen 186 at the phonebook softkey 203 or at the notes softkey 204 while a call is not active, the controller 118 transitions operation of the communication device 104 from the telephone mode 700 (FIG. 7) to the phonebook mode 702 or the notes mode 704, respectively, as represented by respective arrow 708 or 710. Upon detection of the logic high level signal from the sensor 604 or 606 via bus 191, the controller 118 transitions operation of the communication device 104 from the telephone mode 700 to the camera mode 706 as represented by arrow 712.

In the phonebook mode 702, the controller 118 configures the display 184 (FIG. 10) to display the softkeys 202–205 with the phonebook softkey 203 darkened, the message "phonebook" followed by a list of names 1002, and a menu level icon 1004. The list of names 1002 is stored in the memory 139 of the controller 118 along with corresponding telephone numbers. Upon detection of touching the touchscreen 186 at the phonebook softkey 203 while a name (such as "Michael Smith" in FIG. 10) is highlighted by a cursor 1006, the controller 118 retrieves a telephone number associated with the name. Upon detection of right and left actuation of the toggle switch 129 via bus 127, the controller 118 configures the display 184 to move the cursor 1006 up and down the list of names 1002, respectively. Upon detection of touching the touchscreen 186 at the menu level icon 1004, the controller 118 accesses additional functions of the phonebook mode 702, such as storing names and corresponding telephone numbers. Upon detection of touching the touchscreen 186 at the telephone softkey 202 or at the notes softkey 204 via bus 166, the controller 118 transitions operation of the communication device 104 from the phonebook mode 702 (FIG. 7) to the telephone mode 700 as represented by arrow 713 or the notes mode 704 as represented by arrow 714, respectively. Upon detection of the logic high level signal from the sensor 604 or 606 via bus 191, the controller 118 transitions operation of the communication device 104 from the phonebook mode 702 to the camera mode 706 as represented by arrow 716.

In the notes mode 704, the controller 118 configures the display 184 (FIG. 11) to display the softkey 202–205 with the notes softkey 204 darkened and the message "notes" followed by a list of functions 1102. The list of functions 1102 is stored in the memory 139 of the controller 118. Upon detection of touching the touchscreen 186 at the notes softkey 204 while a function (such as "Save Note") is highlighted by a cursor 1104, the controller 118 executes the function. Upon detection of right and left actuation of the toggle switch 129 via bus 127, the controller 118 configures the display 184 to move the cursor 1104 up and down the list of functions 1102, respectively. The "Save Note" function is also accessible from the note taking mode 732 (FIG. 9) via actuation of the menu level icon 902 as previously described. During execution of the "Save Note", the controller 118 stores a note, such as the handwritten note 906 written during the note taking mode 732, in the image memory 153 (FIG. 1). Also upon execution of a function, the controller 118 may configure the display 184 to display additional executable functions, such as, entry of an alphanumeric name for naming the note. Upon detection of touching the touchscreen 186 at the telephone softkey 202 or at the phonebook softkey 203 via bus 166, the controller 118 transitions operation of the communication device 104 from the notes mode 704 (FIG. 7) to the telephone mode 700 as represented by arrow 718 or the phonebook mode 702 as represented by arrow 720, respectively. Upon detection of the logic high level signal from the sensor 604 or 606 via bus 191, the controller 118 transitions operation of the communication device 104 from the notes mode 704 to the camera mode 706 as represented by arrow 722.

In the camera mode 706, the controller 118 configures the display 184 (FIGS. 12 and 13) to display the softkeys 202–205 with the camera softkey 205 darkened. In FIG. 12, the housing 110 has been rotated ninety degrees to the ninety degree orientation, as represented by arrow 1204. Upon detection of the logic high level signal from the sensor 604 via bus 191, the controller 118 controls the wireless data transceiver 122 of housing 110 to route image data captured by the CCD camera 188 directly to the display 184 in a landscape orientation 1202. Rotation of the housing 110 allows the housing 189 to rotate on the swivel 190. The swivel 190 permits the housing 189 to be positioned at any angle between zero degrees and 360 degrees with respect to the housing 110. In FIG. 12, the housing 189 has been rotated on the swivel 190 180 degrees, as described by arrow 1206. In this position, the lens of the CCD camera 188 faces rearward and captures an image 1200 located physically behind the communication device 104, i.e., the face of a person facing the rear surface 300 (FIG. 3) of the communication device 104.

In FIG. 13, the housing 110 has been rotated an additional 90 degrees to the 180 degree orientation, as described by arrow 1304. Upon detection of the logic high level signal from the sensor 514 via bus 191, the controller 118 controls the wireless data transceiver 122 of housing 110 to route image data captured by the CCD camera 188 directly to the display 184 in a portrait orientation 1302. The housing 189 has been rotated on the swivel 190 an additional 180 degrees, as described by arrow 1306. In this position, the lens of the CCD camera 188 faces forward, out of the page, and captures an image 1300 located in front of the communication device 104, i.e., facing the front surface 200 (FIG. 2) of the communication device 104.

In the camera mode 706, the photo switch 133 and the video switch 135, which are disposed in the recess 400 of the housing 108, are revealed. Upon detection of actuation of the photo switch 133 via bus 127 (FIG. 1), the controller 118 controls the wireless data transceivers 117 and 122 to couple transmit image data captured at an instant in time by the CCD camera 188 to the image DSP 152 for storage in the image memory 153 as a photo snapshot. Upon detection of actuation of the video switch 135 via bus 127 (FIG. 1), the controller 118 controls the wireless data transceivers 117 and 122 to initiate coupling of transmit image data captured by the CCD camera 188 to the image DSP 152 for storage in the image memory 153 as a video clip. Upon detection of an additional actuation of the video switch 135, the controller 118 controls the wireless data transceivers 117 and 122 to terminate coupling of the transmit image data. Upon detection of right and left actuation of the toggle switch 129 via signals on bus 127, the controller 118 configures the display 184 to display the images 1200 and 1300 zoomed-in and zoomed-out, respectively. Upon detection of touching the touchscreen 186 at the camera softkey 205, the controller 118 configures the display 184 to display a list of camera functions (similar to the list of functions 1102, FIG. 11, of the notes mode 704) that permit, for example, assigning a name to or retrieving photo snapshots and video clips stored in the image memory 153. Upon detection of the logic high level signal from the sensor 512 via bus 191 and touching of the touchscreen 186 at the telephone softkey 202, the phonebook softkey 203, or the notes softkey 204, the controller 118 transitions from the camera mode 706 (FIG. 7) to the telephone mode 700 as represented by arrow 724, the phonebook mode 702 as represented by arrow 726, or the notes mode 704 as represented by arrow 728, respectively.

Thus it can be seen that a multi-mode communication device employs two separable housings detachably coupled via a rotatable latch. When the housings are attached in a first orientation, the device operates in a first mode, such as a telephone mode. In the first mode, the device can be placed in a calling state. When the housings are attached and in a second orientation, the device operates in a second mode of operation, such as a camera mode. When the housings are detached during a calling state, the device operates in a third mode, such as a note taking mode. In the second and third modes, an image is captured and a plurality of image data is generated therefrom. By permitting detachment, one housing can be positioned at a distance while the other housing can be maintained in close enough proximity for the user to participate in a call. This is beneficial in noisy environments or when privacy is necessary. Detachment also allows disposal of the user interface across multiple surfaces of the device, thereby, minimizing the size of multi-mode communication devices.

What is claimed is:

1. A hand-held radiotelephone having a plurality of different operating modes, the hand-held radiotelephone comprising:

a housing;

an antenna;

a transceiver housed in the housing and coupled to the antenna;

a speaker housed in the housing and coupled to the transceiver;

a microphone housed in the housing and coupled to the transceiver; and a display housed in the housing and coupled to the transceiver, the display selectively attachable to and detachable from the housing, the display, when attached to the housing, configured to facilitate a first one of the plurality of different operating modes of the hand-held radiotelephone, and the display, when detached from the housing, configured to facilitate a second one of the plurality of different operating modes of the hand-held radiotelephone.

2. A hand-held radiotelephone according to claim 1 further comprising a camera mounted to the display to travel with the display upon detaching of the display from the housing, the camera coupled to the transceiver.

3. A hand-held radiotelephone according to claim 2 wherein the camera is mounted to the display via a swivel, the swivel facilitating rotation of the camera greater than 180 degrees.

4. A hand-held radiotelephone according to claim 2 wherein the first one of the plurality of different operating modes is a telephone mode for facilitating telephonic communication between the hand-held radiotelephone and a remote device, the second one of the plurality of different operating modes is a video conferencing mode, the display, during the video conferencing mode, configured to display an image of a user of the remote device, and the camera, during the video conferencing mode, configured to capture an image of a user of the hand-held radiotelephone.

5. A hand-held radiotelephone according to claim 2 wherein the display and the camera are coupled to the transceiver via a wireless data communication link.

6. A hand-held radiotelephone according to claim 2 further comprising a touchscreen housed in the housing and coextensive with the display, the touchscreen to travel with the display upon detaching of the display from the housing, the touchscreen coupled to the transceiver.

7. A hand-held radiotelephone according to claim 6 wherein the first one of the plurality of different operating modes is a telephone mode for facilitating telephonic communication between the hand-held radiotelephone and a remote device, the second one of the plurality of different operating modes is a note-taking mode, the display, during the note taking mode, configured to display a tablet area, and the touchscreen, during the note taking mode, configured to capture a note written at the tablet area.

8. A hand-held radiotelephone according to claim 6 wherein the display, when attached to the housing, is configured to display a telephone keypad so as to facilitate telephonic communication between the hand-held radiotelephone and a remote device.

9. A hand-held radiotelephone for communicating with a remote device, the hand-held radiotelephone comprising:

a first housing having first and second sides;

a first transceiver housed in the first housing, the first transceiver to receive communication signals from the remote device and to transmit communication signals to the remote device;

a speaker positioned behind at least one opening in the first side of the first housing, the speaker coupled to the first transceiver;

a microphone positioned behind at least one opening in the first side of the first housing, the microphone coupled to the first transceiver;

a second transceiver housed in the first housing, the second transceiver coupled to the first transceiver;

a first latch portion carried on the second side of the housing;

a second housing;

a second latch portion carried on the second housing, the second latch portion to detachably mate the first latch portion and, thereby, selectively attach and detach the first and second housings;

a third transceiver housed in the second housing, the third transceiver to communicate with the second transceiver;

a display housed in the second housing and coupled to the third transceiver, the display, when the first housing is attached to the second housing, viewable from the second side of the first housing, and the display, when the second housing is detached from the first housing, viewable from any one of the first and second sides of the first housing; and a camera mounted to the second housing and coupled to the third transceiver, the camera, when the first housing is attached to the second housing, stowed on the second side of the first housing, and the camera, when the second housing is detached from the first housing, free to rotate and capture images from any one of the first and second sides of the first housing.

10. A hand-held radiotelephone according to claim 9 wherein the hand-held radiotelephone, when the second housing is attached to the first housing, operable in a telephone mode during which the display displays a telephone keypad to facilitate telephonic communication between the hand-held radiotelephone and the remote device, and the hand-held radiotelephone, when the second housing is detached from the first housing during the telephone mode, operable in a video conferencing mode during which the display displays an image of a user of the remote device and the camera captures an image of a user of the hand-held radiotelephone.

11. A hand-held radiotelephone according to claim 9 wherein the first transceiver is a radio frequency transceiver, the second transceiver is an infrared (IR) transceiver comprising an IR emitter and an IR detector, and the third transceiver is an IR transceiver comprising an IR emitter and an IR detector.

12. A hand-held radiotelephone according to claim 9 further comprising:

a first battery housed in the first housing;

a first set of battery terminals carried on the first latch portion, the first set of battery terminals coupled to the first battery;

a second battery housed in the second housing; and a second set of battery terminals carried on the second latch portion, the second set of battery terminals coupled to the second battery;

wherein the first and second batteries power the hand-held radiotelephone when the second housing is attached to the first housing, the first battery solely powers the first and second transceivers when the second housing is detached from the first housing, and the second battery solely powers the display, the camera and the third transceiver when the second housing is detached from the first housing.

13. A hand-held radiotelephone according to claim 9 further comprising a touchscreen housed in the second housing and coextensive with the display, the touchscreen coupled to the third transceiver.

14. A hand-held radiotelephone according to claim 13 wherein the hand-held radiotelephone, when the second housing is attached to the first housing, operable in a telephone mode during which the display is configured to display a telephone keypad and the touchscreen is configured to capture touches made at the telephone keypad, and the hand-held radiotelephone, when the second housing is detached from the first housing during the telephone mode, operable in a note taking mode during which the display is configured to display a tablet area and the touchscreen is configured to capture a note written at the tablet area.

15. A hand-held radiotelephone for communicating with a remote device, the hand-held radiotelephone comprising:

a first housing;

radio circuitry housed in the first housing, the radio circuitry to receive communication signals from the remote device and to transmit communication signals to the remote device, the communication signals comprising at least one of image data, speech data and control data;

a speaker housed in the first housing and coupled to the radio circuitry, the speaker to output audible voice signals converted from the received speech data;

a microphone housed in the first housing and coupled to the radio circuitry, the microphone to receive audible voice signals for conversion into speech data for transmission;

image circuitry housed in the first housing and coupled to the radio circuitry, the image circuit to decompress received image data and to compress image data for transmission;

a first data transceiver housed in the first housing and coupled to the image circuitry, the first data transceiver to transmit decompressed received image data and to receive image data for compression;

a first latch portion housed in the first housing;

a controller housed in the first housing and coupled to the radio circuitry, the image circuitry, the first data transceiver and the first latch portion, the controller to control operation of the hand-held radiotelephone;

a second housing;

a second latch portion housed in the second housing, the second latch portion to detachably mate the first latch portion and, thereby, selectively attach and detach the first and second housings;

a second data transceiver housed in the second housing to communicate with the first data transceiver, the second data to receive the decompressed received image data and to transmit the image data for compression;

a display housed in the second housing and coupled to the second data transceiver; and a camera housed in the second housing and coupled to the second data transceiver;

wherein the controller controls the hand-held radiotelephone to operate in a telephone mode when the first and second latch portions are mated, and controls the hand-held radiotelephone to operate in a video conferencing mode when the first and second latch portions are detached, the display, during the video conferencing mode, displaying decompressed received image data, and the camera, during the video conferencing mode, capturing images and generating image data for compression therefrom.

16. A hand-held radiotelephone according to claim 15 further comprising a swivel housed in the second housing, the swivel facilitating rotation of the camera greater than 180 degrees.

17. A hand-held radiotelephone according to claim 15 further comprising:

a first battery housed in the first housing;

a first set of battery terminals carried in the first latch portion, the first set of battery terminals coupled to the first battery;

a second battery housed in the second housing; and a second set of battery terminals carried on the second latch portion, the second set of battery terminals coupled to the second battery;

wherein the first and second batteries power the hand-held radiotelephone when the second housing is attached to the first housing, the first battery solely powers the first and second transceivers when the second housing is detached from the first housing, and the second battery solely powers the display, the camera and the third transceiver when the second housing is detached from the first housing.

18. A hand-held radiotelephone according to claim 15 wherein the first data transceiver comprises a first infrared (IR) detector, a first IR emitter and a first IR channel modem coupled to the first IR detector, the first IR emitter, the image circuitry and the controller, and the second data transceiver comprises a second infrared (IR) detector, a second IR emitter and a second IR channel modem coupled to the second IR detector, the second IR emitter, the display and the camera.

19. A hand-held radiotelephone according to claim 15 wherein the radio circuitry comprises an antenna, a radio frequency (RF) transceiver coupled to the antenna and a channel modem digital signal processor (DSP) coupled to the RF transceiver and the controller, and the image circuitry comprises an image compression/decompression DSP coupled to the channel modem DSP, the controller and the first data transceiver.

20. A hand-held radiotelephone according to claim 15 further comprising a touchscreen housed in the second housing and coupled to the second data transceiver, the touchscreen overlying the display; and wherein the controller controls the hand-held radiotelephone to operate in a note-taking mode when the first and second latch portions are detached during the telephone mode, the controller, during the note-taking mode, communicating control data to the display to configure the display as a tablet, and to the touchscreen to configure the touchscreen to capture a note written at the display and generate image data for compression therefrom.

* * * * *